No. 750,357. PATENTED JAN. 26, 1904.
R. GIBBONS, DEC'D.
J. K. BEACH, ADMINISTRATOR.
HOUSEHOLD IMPLEMENT.
APPLICATION FILED DEC. 9, 1895.
NO MODEL. 2 SHEETS—SHEET 1.
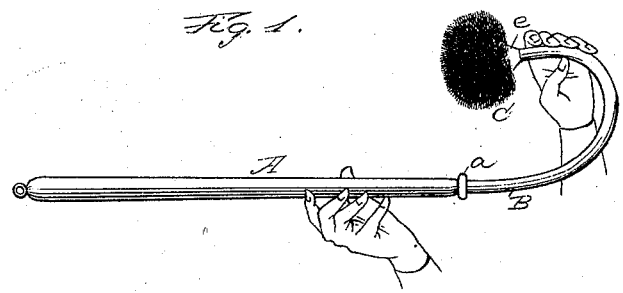
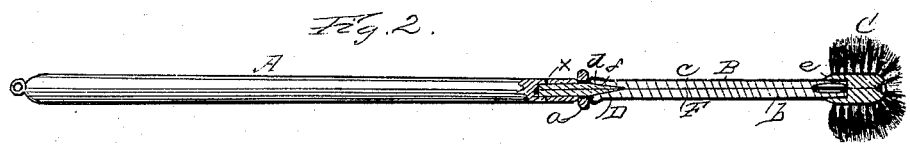
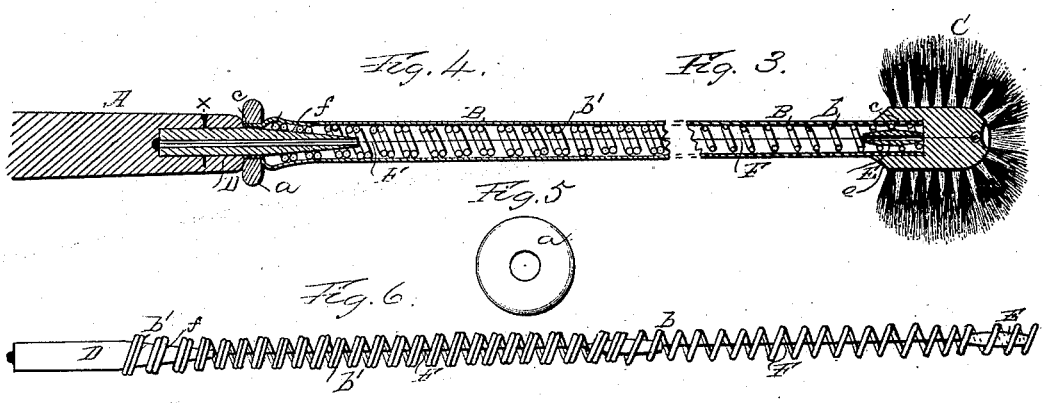
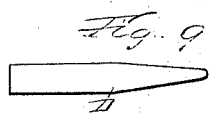
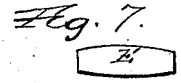
WITNESSES: INVENTOR, No. 750,357. PATENTED JAN. 26, 1904.
R. GIBBONS, DEC'D.
J. K. BEACH, ADMINISTRATOR.
HOUSEHOLD IMPLEMENT.
APPLICATION FILED DEC. 9, 1895.
NO MODEL. 2 SHEETS—SHEET 2.
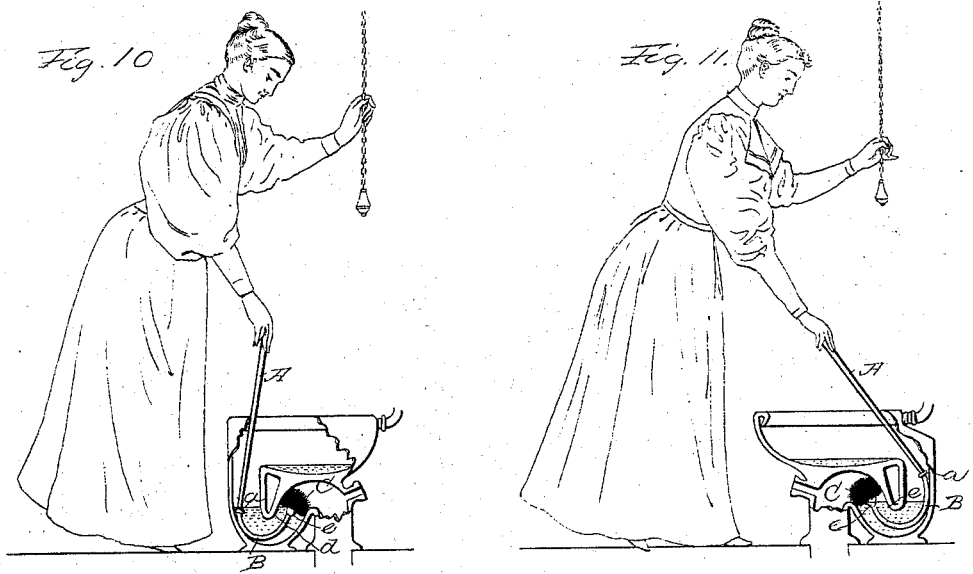
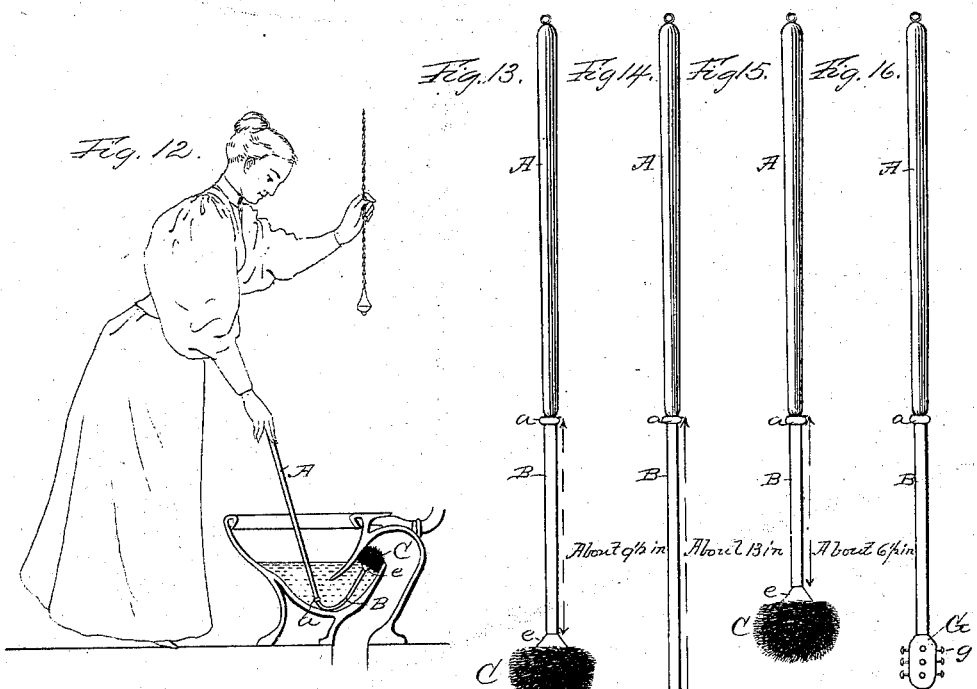
WITNESSES: INVENTOR No. 750,357. Patented January 26, 1904.

UNITED STATES PATENT OFFICE.

RODMOND GIBBONS, OF NEW YORK, N. Y.; JOHN K. BEACH ADMINISTRATOR OF SAID RODMOND GIBBONS, DECEASED.

HOUSEHOLD IMPLEMENT.

SPECIFICATION forming part of Letters Patent No. 750,357, dated January 26, 1904.

Application filed December 9, 1895. Serial No. 571,561. (No model.)

*To all whom it may concern:*

Be it known that I, RODMOND GIBBONS, of the city, county, and State of New York, have made a new and useful Invention in House-Furnishing Implements; and I do declare that the following, in connection with the accompanying drawings, is a full, clear, and exact description and specification of the same.

My invention has reference to a household implement for cleansing the traps of house-tanks, basins, and particularly of water-closets by housekeepers or servants.

It is well known that the water ordinarily used in water-closets will of itself deposit slime; that this slime makes a lodging-place for fecal matter; that it is a natural breeding-place for bacteria that may chance to find lodgment in it; that the lodgment of bacteria in this slime and the consequent propagation and escape of disease-germs are what make the water-closet a medium of communicating disease from unhealthy to healthy persons.

It is also well known that the difficulty of preventing the emission of bad odors and disease-germs from water-closets is chiefly due to the want of a convenient household implement by means of which the trap of a closet may be easily, quickly, and thoroughly cleaned by housekeepers or servants without the disagreeable necessity of thrusting the hand into the trap or of bringing it in contact with the water or the bowl.

In most cases the part of the closet which is not in sight is the source of the noxious odors. In the passage of solid matter through the "fouling-surface" or the trap or through both (as the case may be) portions of it adhere to the slime or the sides thereof, and while the part of the closet which is in sight is usually kept clean the part which is out of sight is apt to be out of mind or neglected. Hence the concealed part of a closet-trap frequently becomes in such a condition that even after liberal flushing it soon contaminates the water which is left standing in it, and the evaporation of the contaminated water contaminates the air which persons are compelled to breathe. Very frequent flushings may, by keeping the accretions well washed, prevent the emission of bad odors from a closet; but as they do not prevent the formation of slime in the trap they are no surety against the lodgment of bacteria therein and the propagation and escape of disease-germs which of themselves are entirely odorless. Absolute cleanliness is the only safeguard.

The object of my invention is to obviate the difficulty of keeping rooms and dwellings free from disease-germs and bad odors arising from house-traps, particularly the traps of water-closets, by supplying a household implement for daily manual use by means of which they can be easily, quickly, and thoroughly cleaned without soiling or wetting the hands, thus preventing the accumulation of slime in the traps and the lodgment of fecal matter or bacteria therein.

My invention consists of certain combinations of certain component parts, specified at the end of this specification, which constitutes a universal trap-cleaner that may be readily manipulated by master, mistress, or maid without repulsive drudgery, without wetting or soiling the hands, as aforesaid, and without soiling the said trap-cleaner or causing it to contract bad odor.

In order that my invention may be fully understood, I have represented in the accompanying drawings and will proceed to describe the best forms of my trap-cleaner which I have thus far produced to embody all parts of my invention, it being understood that the implement may be modified as circumstances or the views of different constructors or users render expedient, and according to my entire invention the only parts of it are used in its construction.

In the said drawings, Figure 1 represents a side view of my trap-cleaner. Fig. 2 represents a sectional view of the same, wherein the elastic section B is shortened. Figs. 3 and 4 show enlarged sections of the brush C and its connections. Fig. 5 is an end view of an elastic buffer before it is put in place and distended in the trap-cleaner. Fig. 6 represents a spiral spring *b* without its sheathing, reinforced at and from the end next to the handle A and showing its connection with a combined spring-holder and dowel-pin D, also showing chock-beads E and a check-wire F, fastened at one end. Figs. 7 and 8 are chock-beads E on a larger scale, shown inside of the spiral spring above them in Fig. 6. Fig. 9 is a side view of a combined spring-holder and dowel-pin before it is fastened into the spiral spring b. Figs. 10, 11, and 12 represent my trap-cleaner in use. Figs. 13, 14, and 15 show the relative lengths of section B in my trap-cleaner best adapted to the "hopper," the "washout," and the "siphon" classes of water-closets, respectively. Fig. 16 represents a modification of my trap-cleaner.

The principal members of my new implement are the handle A of suitable size and form to be grasped by hand and used without allowing the hand to touch the closet, bowl, or tank, the single brush-head C, and the intermediate elastic section B, by which the handle and the brush-head are connected and combined. This intermediate section B is necessarily resilient and is composed of an elastic material, the best form of which is, in my opinion, a spiral spring b, (with or without reinforcement by an auxiliary spring, as shown at b', Fig. 6 of the drawings, or some substitute therefor,) covered with a waterproof sheathing c, made, preferably, of india-rubber, and the said section is fastened at its respective ends to the rigid handle A and the brush C. The elasticity of this section B is preferably so graduated (by the addition of the auxiliary spring b' or its substitute) that in operating the implement it requires no other support between the single brush-head C and the handle A to prevent it from buckling than the wall of the trap to which it is adapted, and so, also, that the form of the brush shall not be destroyed by too much lateral pressure. In implements for use in water-closets particularly the lengths of this section B are graduated to adapt them to different classes of closets, as per Figs. 13, 14, and 15 and the foregoing reference thereto.

In order to guard against the possible loss of the brush in the waste-pipe of the basin and also to prevent any damaging longitudinal strain on said section in the use of the implement when my entire invention is employed, a check-wire F is employed, which passes through the inside of said section and is fastened to the handle A at one end and to the brush C at the other end. In some traps the lower turn of the upper bend d, Figs. 10, 11, and 12, presents a narrow ridge caused by the abruptness of said bend, and in order that this abrupt bend may not prevent the easy withdrawal of the brush-head in case it be improperly pushed beyond said bend (as it is likely to be) the brush-stock should be beveled, as at e. The dimensions of the several parts of the implement should be adapted to the size of the trap in which the implement is to be used, and the diameter of the brush should be about a quarter of an inch greater than the nominal diameter of the trap.

The elastic buffer a, made, preferably, of pure vulcanized india-rubber, is to prevent the end of the handle A from injuring the basin, bowl, or trap when the implement is in use. The chock-beads E are made, preferably, of soft wood. One is jammed in the brush end of the spiral spring to prevent the waste of india-rubber cement used for cementing section B into the brush-stock. (See Fig. 3.) The other is used to keep the end of the reinforce spiral spring in its place. (See Fig. 6.) The combined spring-holder and dowel-pin D is made, preferably, of young-growth hickory wood. Its tapered end f is screwed into the end of the spiral spring b, which makes its own thread. (See Figs. 4 and 6.) The other end is doweled into the handle A, Fig. 3, with waterproof cement and also nailed at x.

The modification of my new implement represented at Fig. 16 has reference to the brush-head alone. As a substitute for a brush-head there is block G, with short pins g fastened into said block, so that a wad of tow or its equivalent may be secured to it and used as a substitute for the bristles or horsehair.

In the use of the implement the brush-head C is not designed to pass beyond the water seal in the trap, as this might foul the brush-head without serving any useful purpose, and the movement of the brush is preferably longitudinal only with the trap and not rotary. If used daily in a closet that is thoroughly clean at the start, a few longitudinal movements of the brush are sufficient, with the help of the "flush," to remove the fresh slime, and the time required is only a few seconds. When properly made and thus used, the brush needs no other washing than it receives from the flush of water through the closet. It remains stainlessly clean and contracts no bad odor. Being made, preferably, of horsehair on a block that has been boiled in paraffin the water may be readily shaken out of it after use, leaving no drip.

In the construction of the elastic section B of my new implement I would prefer to use a single graduated spiral spring made of tapered wire covered with waterproof sheathing, but the present state of the art does not admit of the production of such a spring, except at an excessive and impractical cost, or the said section might be made entirely of india-rubber, but the cost of this would also be excessive. Of the available methods of constructing the said elastic section B, I have tested the use of various elastic materials and combinations thereof and find it easier to adjust and graduate the elasticity of said section to the requirements of the implement by the construction hereinbefore particularly described than by any other that I have tested.

I have found that the insertion of the combined spring-holder and dowel-pin D into the end of a spiral spring, as shown in Fig. 4, serves practically as a reinforce to this end of the spring and is useful.

I am aware of the multiple brush described in the patent issued to Chas. F. Pike, No. 270,975, dated January 23, 1883, and disclaim the same as materially and substantially different from mine in the elements of combination, the principles of construction, and the mode of operation.

Having thus described my invention, what I claim as new, and desire to secure by Letters Patent, is—

1. The combination of a rigid handle, a single brush-head and an intermediate elastic, resilient section connecting the two consisting of a spiral spring inclosed with a waterproof sheathing, said intermediate section having a diameter relatively less than that of said brush, substantially as described.

2. The combination of a rigid handle, a single brush-head and an intermediate elastic section connecting the two having a graduated elasticity from the handle toward the brush-head, substantially as described.

3. The combination of a rigid handle, a brush-head, an intermediate elastic section connecting the two (consisting of a spiral spring inclosed with a waterproof sheathing) and a combined dowel-pin and spring-holder by means of which the said intermediate section is secured to the rigid handle and which serves also for reinforcing the said spiral spring at the end next to the rigid handle, substantially as described.

4. The combination of a rigid handle, a brush-head, an intermediate elastic section connecting the two consisting of a spiral spring covered with a waterproof sheathing and having on the inside thereof at the end farthest from the handle, a chock-bead, substantially as described.

RODMOND GIBBONS.

Witnesses:
W. L. Bennem,
Isaac Henthom.